United States Patent
Epstein et al.

Patent Number: 6,052,406
Date of Patent: Apr. 18, 2000

[54] FREQUENCY HOPPING SYNCHRONIZATION AND TRACKING IN A DIGITAL COMMUNICATION SYSTEM

[75] Inventors: Marvin A. Epstein, Monsey, N.Y.; Gary V. Blois, Towaco; Joseph M. Fine, West Caldwell, both of N.J.

[73] Assignee: ITT Manufacturing Enterprises, Inc., Wilmington, Del.

[21] Appl. No.: 08/850,231

[22] Filed: May 2, 1997

[51] Int. Cl.[7] .............. H04K 1/00; H04K 1/04; H04L 27/30; H04L 7/00

[52] U.S. Cl. ................ 375/202; 375/200; 375/355

[58] Field of Search ............... 375/202, 200, 375/355, 208, 209, 210, 367, 365, 362, 354, 371

[56] References Cited

U.S. PATENT DOCUMENTS

| | | | |
|---|---|---|---|
| 4,752,939 | 6/1988 | Amoroso et al. | 375/202 |
| 5,339,331 | 8/1994 | Beauchamp et al. | 375/202 |
| 5,373,536 | 12/1994 | Dehner, Jr. et al. | 375/202 |
| 5,442,659 | 8/1995 | Bauchot et al. | 375/354 |
| 5,444,697 | 8/1995 | Leung et al. | 370/207 |

Primary Examiner—Stephen Chin
Assistant Examiner—Betsy L. Deppe
Attorney, Agent, or Firm—Saul Elbaum

[57] ABSTRACT

There is disclosed an improved frequency hopping synchronization and tracking system for bit syncing and frame syncing a digital data signal as transmitted by a radio transmitter. A detection means responsive to incoming data samples representative of the phasing signal portion of the digital data signal partitions the data samples into alternating first and second sample sequences and correlates the samples against a frequency hop modulation code reference sequence to provide an initial data signal detection. A post-detection means responsive to the initial detection and to the frequency hop modulation code reference sequence correlates the incoming data samples and compares the spectral power of the correlated data samples to a threshold value to provide bit sync of the detected data signal. Tracking means responsive to the bit sync and to the input samples captures a frame signal and generates histograms of data bit transitions for producing an error signal indicative of the difference of the transmitted clock rate and the sampling position of the received bit. A clock means responsive to the error signal produced by the histogram process can be adjusted according to the error signal to enable sampling of each received data bit to occur relatively at the center of each bit to ensure reliable decoding or detection of a digital data signal in a noisy channel at the receiver.

42 Claims, 12 Drawing Sheets

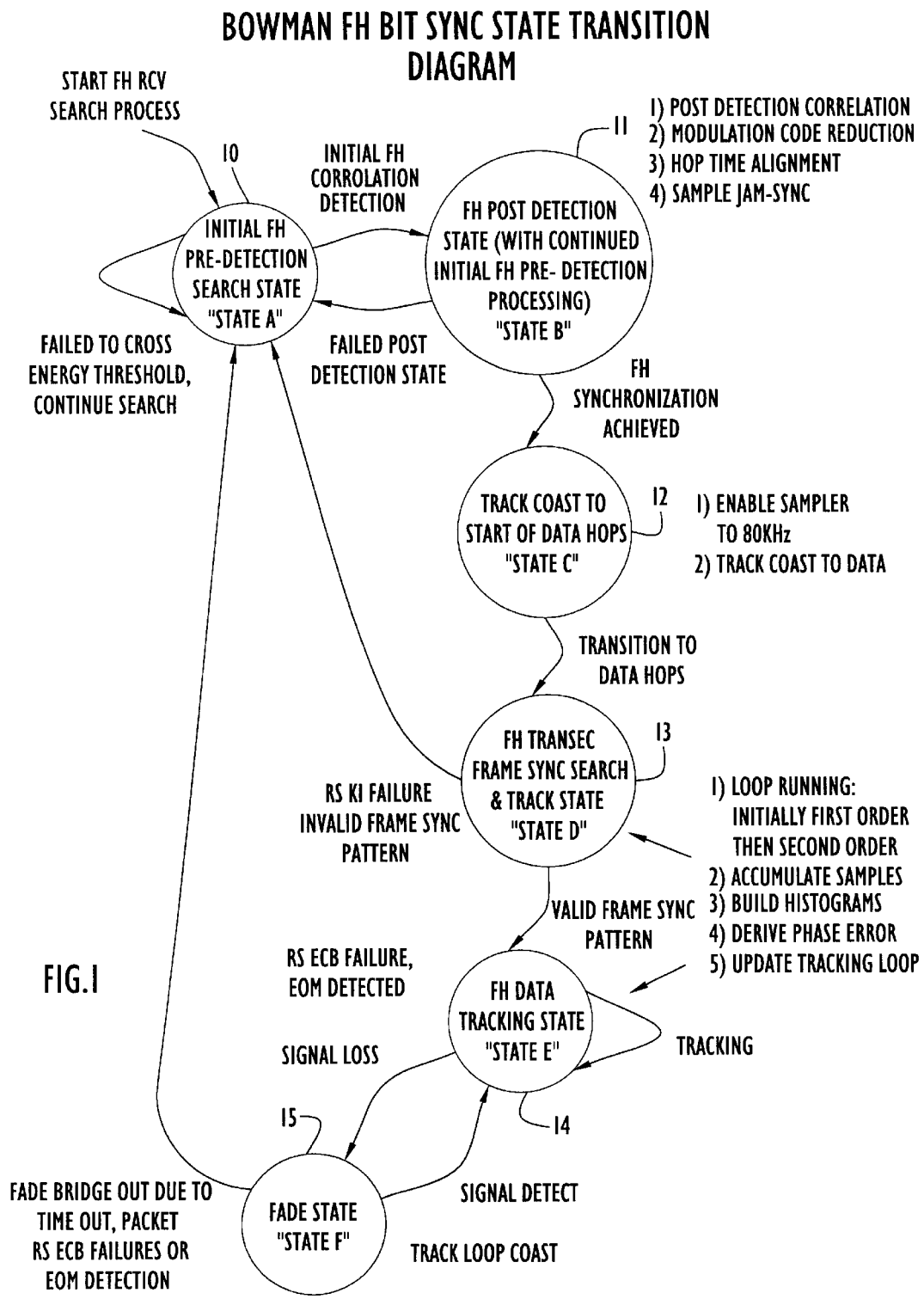

SAMPLING PROCESS FOR
INITIAL FH PRE-DETECTION SEARCH

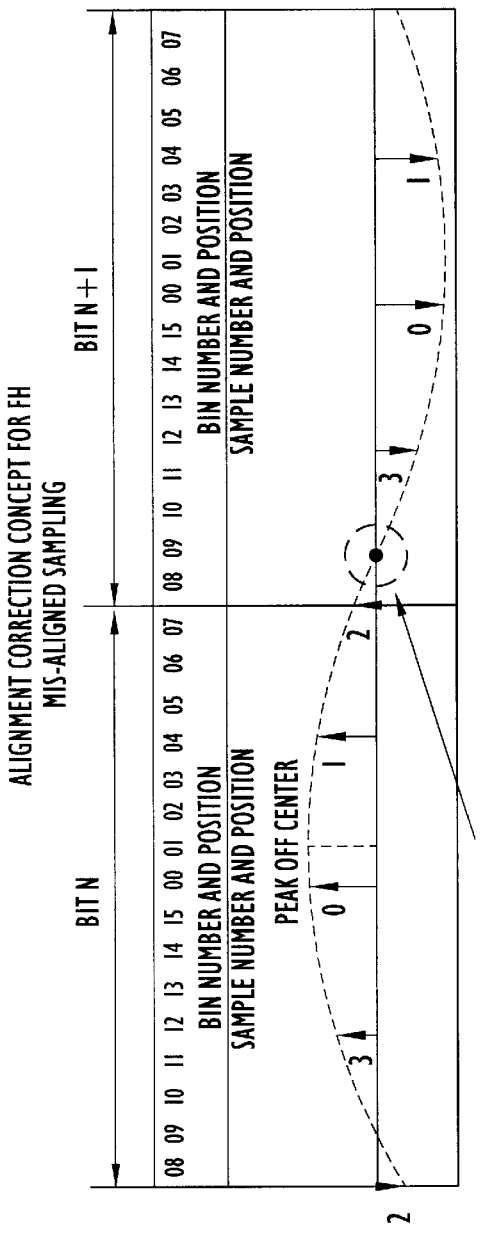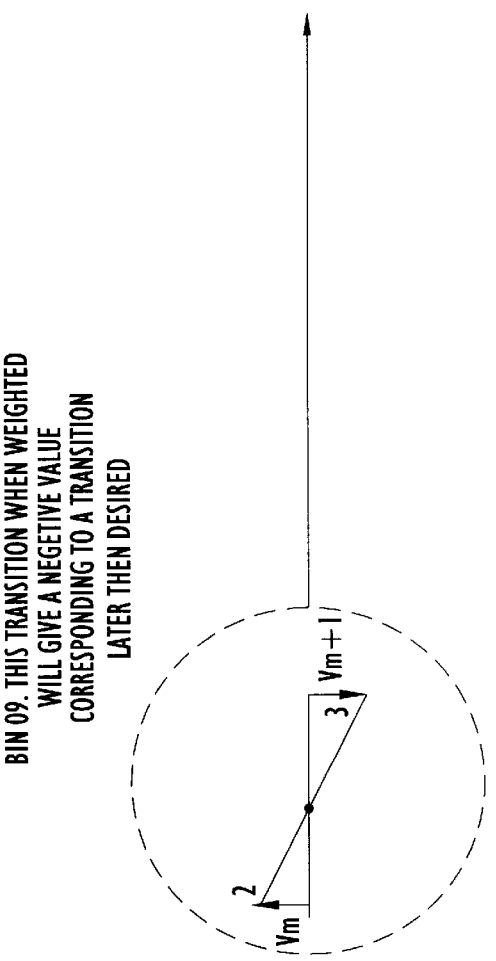
FIG.8

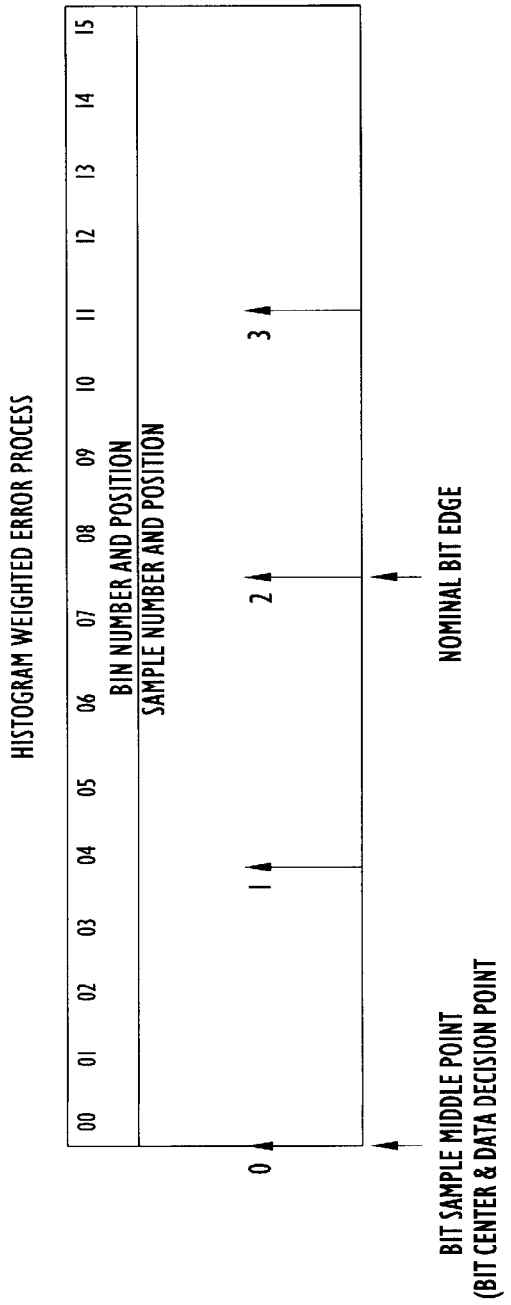
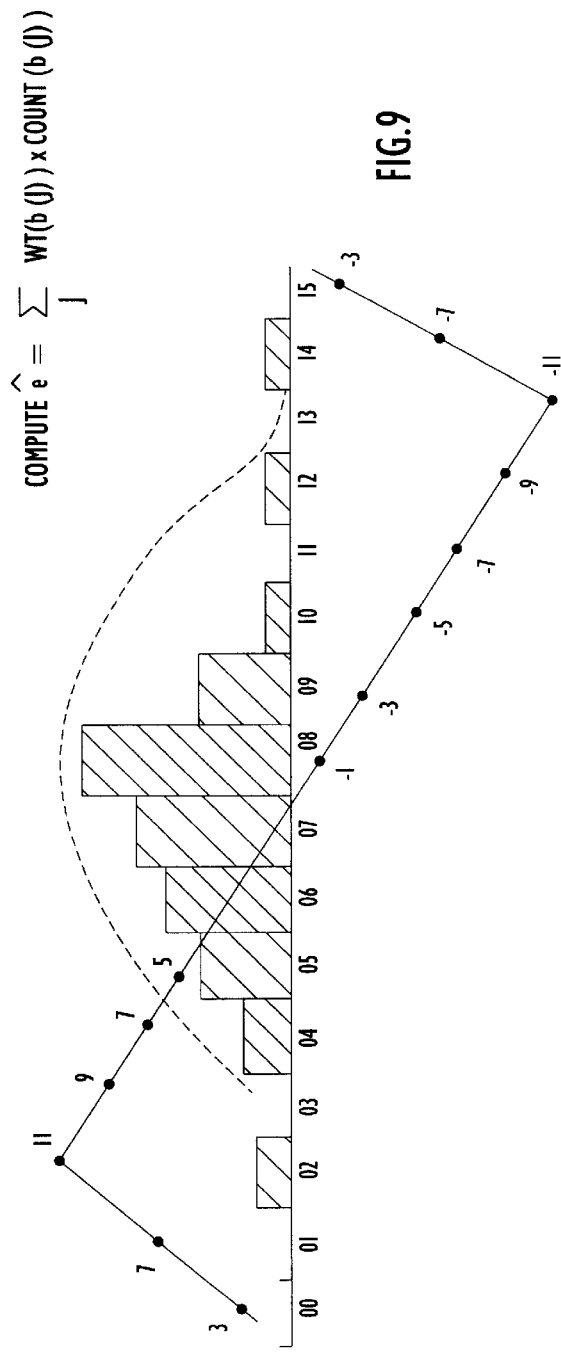
FIG. 9

FREQUENCY HOPPING SYNCHRONIZATION AND TRACKING IN A DIGITAL COMMUNICATION SYSTEM

FIELD OF THE INVENTION

The invention relates to digital communication systems, and more particularly, to a digital radio system apparatus including apparatus for providing sync detection to allow frequency hopping synchronization and tracking of the transmitted digital signals.

BACKGROUND OF THE INVENTION

Digital radio for carrier telephony appeared in the early 1970's and was limited to modest spectral efficiencies and relatively short distances. The field has greatly grown over the past decades and the use of digital radio is widespread. Spread spectrum systems and, in particular, frequency hopping transmission systems, have produced results in communications, navigation and test systems that were not possible with standard signal formats. Frequency hopping signal transmission systems are a type of spread spectrum system in which the wideband signal is generated by hopping from one frequency to another over a large number of frequency choices. The frequencies used are chosen by a code similar to those used in choices. The frequencies used are chosen by a code similar to those used in direct sequence systems. For general background on spread spectrum systems, reference is made to a text entitled *Spread Spectrum Systems,* 2nd edition, by Robert C. Dixon and published by Wiley-Interscience, New York (1984). In order to increase the efficiency of digital radios employing spread spectrum characteristics, digital engineers have raised the number of modulation levels and have generally dealt with modulation/demodulation techniques, spectral shaping and synchronization schemes. This has led to widespread and more efficient use of the digital radio systems.

As one can ascertain, a major problem in the transmission of digital data signals is interference due to noise. Hence, noise, in any communication system, plays an important part in the design and operation of the system. For general background on digital radio and particularly for microwave operation, reference is made to a text entitled *Microwave Digital Radio* edited by Larry J. Greenspan and Mansoor Shafi and published by the IEEE Press, the Institute of Electrical and Electronic Engineers, New York (1988).

During the past decade, many improvements have been implemented involving advanced digital radio techniques. Digital radio is used both commercially and for the military. As one can ascertain in dealing with digital data transmission, as data generated by computer systems and so on, one has to be extremely careful in processing the information so that the desired bits and the content of the bit patterns are easily recognized and decoded.

In order to do so, many systems operate with a synchronization system where a bit sync pattern is generated by the transmitting system and is detected by the receiving system. This bit sync pattern, once accessed at the receiver, synchronizes the receiver's clocks so that all incoming digital data is sampled at the proper time and at the proper interval. This is extremely important in the transmission of digital data. As one can ascertain in regard to digital data, if the clock at the receiver drifts with respect to the transmitted clock then the data can not be properly decoded and processed.

Thus, a major specification of such systems is the reliable processing of digital data by performing the retrieval of a transmitted synchronization signal and then utilizing that signal to synchronize the clock or the timing generators at the local receiver. This is a common problem in communication systems of all kinds, and is particularly important in the formulation of digital data.

In order to synchronize transmitted and received data over a communication medium, phasing signals are employed to provide bit sync, and framing signals are employed to provide frame sync.

It is extremely desirable in all systems to synchronize the receiver clock with the transmitting clock so that sampling can be performed preferably at the center of the data bit to assure reliable decoding and to prevent noise from interfering with the retrieval of data at the receiver.

This is important in the transmission of digital data as compared to the transmission of voice. As indicated, such techniques are well-known including techniques for generating digital sequences and various methods for retrieving sync and framing data. This application relates to some novel approaches to generate and retrieve the sync data as well as frame sync by utilizing digital processing techniques as will be further explained.

It is therefore an object of this invention to provide an improved system operative with a digital radio or communication system which enables one to synchronize and maintain synchronization during a transmission between a transmitter and a receiver.

SUMMARY OF THE INVENTION

It is an object of the present invention to provide improved frequency hopping synchronization and tracking in a digital communications system having a transmitter for transmitting a digital data signal via a noisy transmission path, the digital data signal having a phasing signal portion and a framing signal portion and used to synchronize a clock at a receiver responsive to the transmitted signal for receiving the same, comprising: detection means responsive to incoming data samples representative of the phasing signal portion of the digital data signal for partitioning the data samples into alternating first and second sample sequences and correlating the sequences against a frequency hop modulation code reference sequence to provide an output signal indicative of the correlated samples and of a data signal detection; post-detection means responsive to the output signal and to the frequency hop modulation code reference sequence for correlating the incoming data samples and comparing the spectral power of the correlated data samples to a threshold value to provide a sync output signal indicative of frequency hop synchronization of the detected data signal; tracking means responsive to the sync output signal and the received signal for periodically providing histograms of data bit transitions for producing an error signal indicative of the difference of the transmitted clock rate and the sampling position of a received bit; and clock means responsive to the error signal to provide a clock signal according to the error signal to enable sampling of received data bits relatively at the center of each bit.

It is a further object of the present invention to disclose a method of detecting a phasing signal pattern and a framing signal in a transmitted digital signal for using the detected signal to synchronize a clock at a receiver, comprising the steps of: receiving incoming data samples representative of the digital data signal at a predetermined sampling rate; accepting every other the received incoming data samples and alternately partitioning the every other the received incoming data samples into a first odd and second even sample sequences, whereby the first odd and second even sample sequences sampling rates are one-fourth of the received data samples sampling rate; correlating the odd and even sample sequences against hop frequency modulation reference code sequence sample points to obtain correlation values; summing the magnitudes of the correlation values; computing a power measurement during a predetermined period representative of the spectral energy of the odd and even correlated values; comparing the power measurement with a stored signal energy estimate to provide an output signal if the comparison exceeds a given threshold value, wherein the output signal includes an indication of the start and end points of the correlated samples; merging the odd and even sample sequences into a unified sample sequence; generating first odd and second even reference sample sequences from the combination of preamble bit pattern samples of the known bit pattern and modulation reference code sequence samples; correlating the odd and even reference sample sequences against the unified sample sequence to provide a multiple hop-width correlation samples having multiple hop-width correlation values; computing a post-detection power measurement during a predetermined period representative of the spectral energy of the hop-width correlation values; comparing the post-detection power measurement with a second stored signal energy estimate to provide a sync output signal if the comparison exceeds a given threshold value; decoding the sync output signal to determine the hop-time offset; and adjusting the receiver clock to remove the phase error resulting from the hop-time offset clock drift.

BRIEF DESCRIPTION OF THE DRAWINGS

The invention is to be explained in more detail below based on an embodiment, depicted in two figures where:

FIG. 1 is a bit sync state transition diagram.

FIG. 8 is a diagram useful in showing frequency hopping sample alignment correction.

FIG. 9 is a diagram depicting the process employed for the generation of weighted errors.

DETAILED DESCRIPTION OF THE INVENTION

Figure 1A:
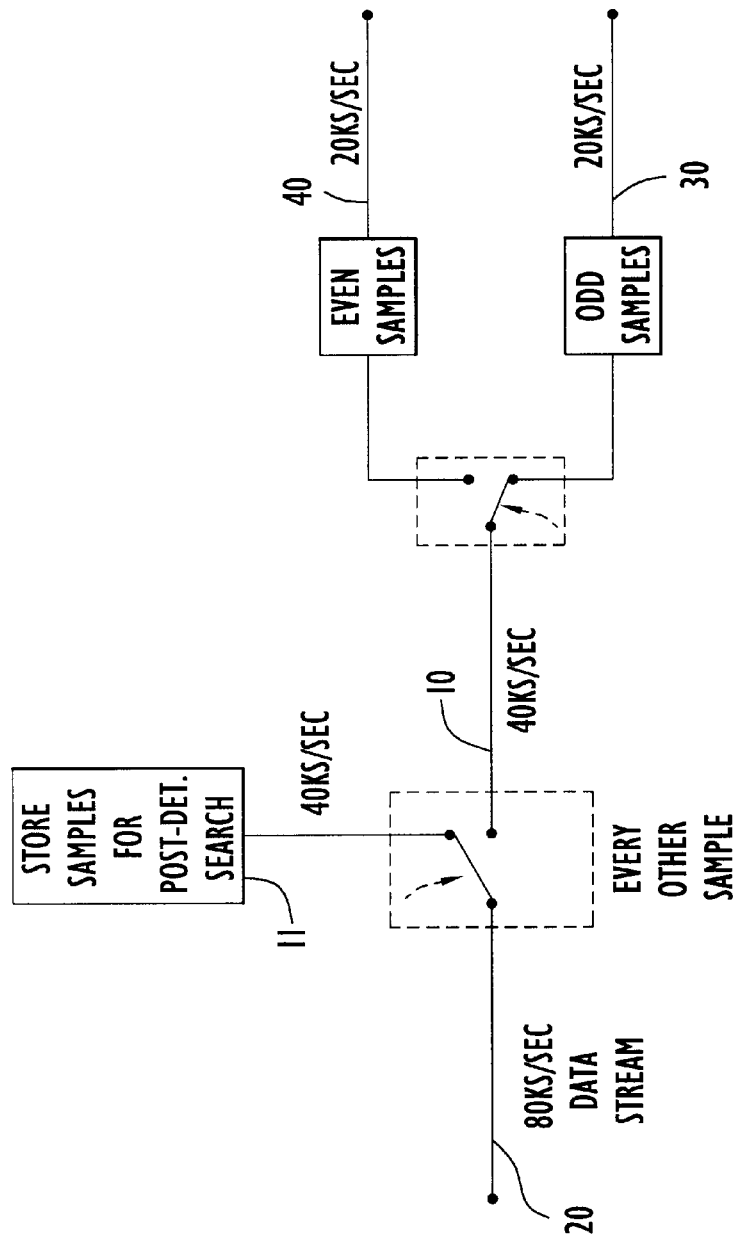
FIG. 1A is a diagram showing the sampling process for the initial frequency hopping pre-detection search procedure.

Before going into detail explaining the nature of the invention the following should be understood. This invention relates to digital radio communications which as indicated is used both commercially and by the military. In military digital communications, certain systems use what is referred to as a frequency hopping signal transmission. Frequency hopping signal transmission systems are a type of spread spectrum system in which the wideband signal is generated by hopping from one frequency to another over a large number of frequency choices. The frequencies used are chosen by a code similar to those used in direct sequence systems. Thus, frequency hopping modulation is essentially frequency shift keying except that the set of frequency choices is greatly expanded. While simple FSK most often uses only two frequencies; for example, f1 is used to signify a "mark", f2 is used to signify a "space". Frequency hopping systems, on the other hand, often have thousands of frequencies available and are selectable on the basis of a code in combination with the information transmitted. Therefore, a frequency hopping system consists basically of a code generator and a frequency synthesizer capable of responding to the coded output from the code generator. A frequency hopping transmission may be referred to as a TRANSEC communication. The TRANSEC acronym stands for "transmission security system". The exact nature of the digital signal is not necessary for an understanding of the present invention. A digital signal, as is well known in the art, is modulated on a carrier and consists of a plurality of ones and zeros which can comprise a data portion, a sync portion, and so on. In frequency hopping systems, such signals may also be preceded by a bit synchronization portion which normally involves a bit pattern indicative of a synchronizing or phasing pattern which is necessary for the receiver to accurately receive and respond to the transmitted signal. The present invention involves the detection of a digital frequency hop (FH) bit sync format. The goal of the initial FH pre-detection and FH post-detection search is the initial detection and subsequent refinement of the data phasing signal in the presence of noise and decoding of modulation reference code bits for achieving FH bit synchronization.

The phasing signal is usually followed by a frame sync pattern. Following detection of phasing the system, to be described, samples at the appropriate system frequency to track the frame data and initiates a frame sync search pattern. FH synchronization is maintained until there is a frame sync detection. Information about the specific correlation sequence is embedded over several frequency hops. If there were a search failure, the system would resume the initial FH pre-detection bit sync search. If the frame sync search is successful, the system changes to a tracking or synchronization maintenance state. As one can see, the main aspect of the system receiver is to ensure that the receiver's clock or timing reference source is synchronized to the transmitter's clock so that the digital data contained in the digital signal can be accurately and reliably decoded or demodulated.

Figure 2:
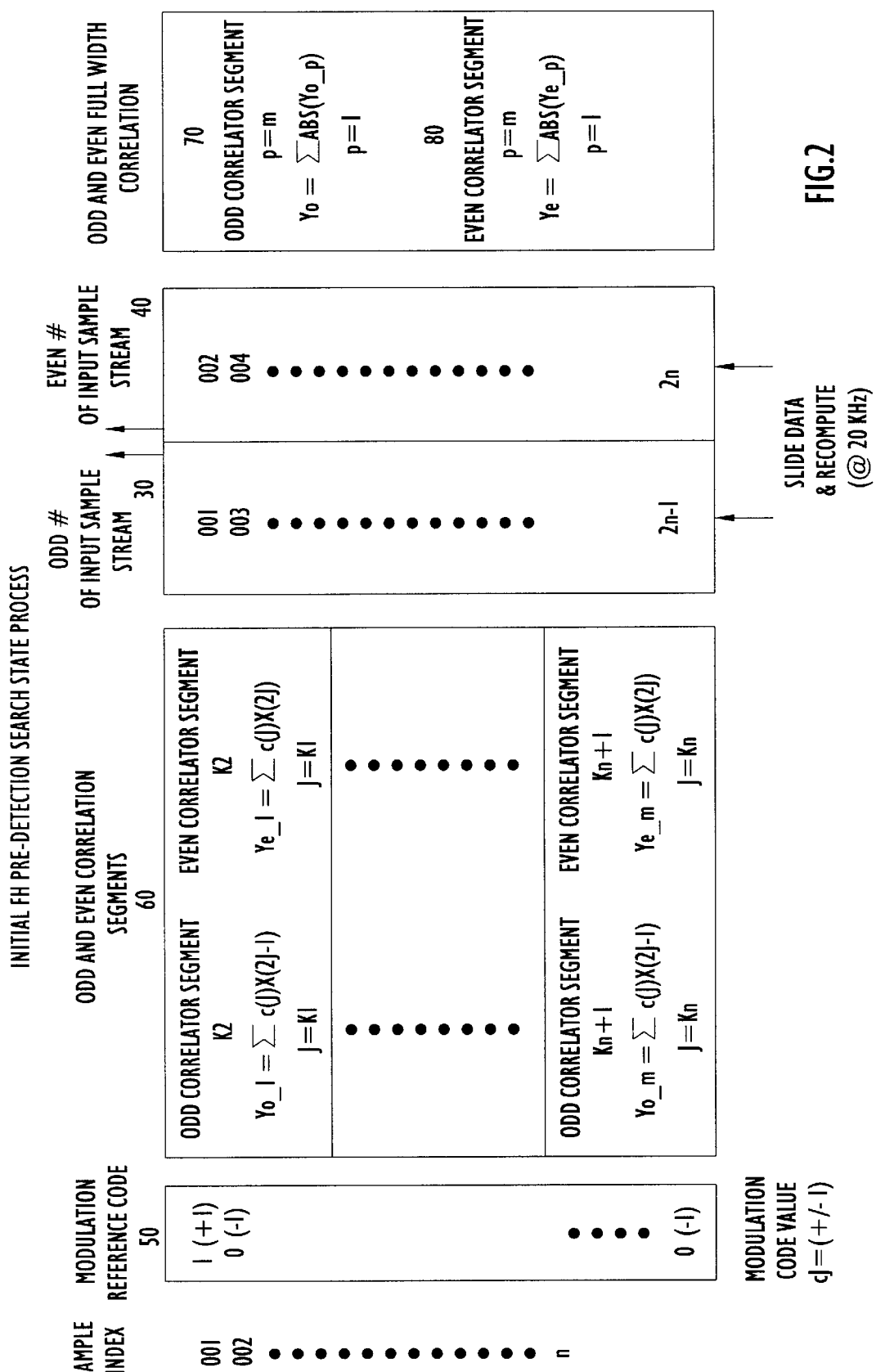
FIG. 2 is a diagram showing the initial frequency hopping pre-detection search procedure.

Referring to FIG. 1 there is shown a FH bit sync state transition diagram which is useful in explaining the operation of the search and acquisition algorithm as utilized in performing the initial bit sync search or detection. Reference numeral 10 refers to a module which performs an initial FH pre-detection search to provide an initial determination of whether or not a phasing signal is present in the noisy transmission medium. In this initial state, the digital receiver (not shown) is tuned to a selected frequency. FM demodulated data samples are input at 80 KS/sec, as illustrated in FIG. 1A reference numeral 20. The actual FH pre-detection process 10, however, uses every other sample (i.e. 40 KS/sec). This value is considered the hop frequency. The samples that are not used in the pre-detection search (i.e., every other sample) are stored for the subsequent FH post-detection search 11. As shown in FIG. 1A, the 40 KS/sec pre-detection samples (reference numeral 10) are split into two 20 KHZ "odd" (reference numeral 30) and "even" (reference numeral 40) sample sequences obtained by taking every other, "other sample" of the incoming 80 KS/sec data stream (reference numeral 20). As shown in FIG. 2, a modulation reference code sequence 50 is associated with the hop frequency and is used as a reference for the initial correlation detection. This reference is encoded as a sequence of scaled +1's or −1's depending on whether the code bit is a 0 or 1 respectively. A scaling factor, $KREF_{PRE}$, of 26,320, is used to scale the reference modulation code sequence. The reference modulation code sequence is FHCBH (Frequency Hop Code Bits per Hop) bits in length at a 20 KS/sec rate and is divided into several segments. As FIG. 2 shows, each reference segment is correlated (reference numeral 60) with corresponding segments of the received "odd" and "even" sample sequences (reference numerals 30 and 40). At a 20 KHZ rate, two new "odd" and "even" samples are obtained from an A/D converter (not shown). The oldest samples from the "odd" and "even" sequences are discarded and the new samples are added to form a new pair of "odd" and "even" sequences (Pair n+1).

Since the transmitted segment polarities may be positive or negative, the absolute values of all of the odd segment correlation results are summed to form a 'full width' odd correlation 70. Likewise, the absolute values of all of the even segment correlation results are summed to form a 'full width' even correlation 80. The "odd" and "even" full width correlation results are each squared and compared to a current (i.e. 'running') scaled power threshold. If either or both results exceed the power threshold, a post-detection search or searches are scheduled. The threshold value used for pre-detection declaration is a relative number proportional to the average power and computed five times each millisecond, i.e., once every 8 samples. The 'running' power threshold is computed by calculating an average power $P_{ave}(n)$ at sample points 4, 12, 20, 28, and 36 of a 40 sample (i.e. one millisecond) block using the previous 248 samples. The minimum acceptable pre-detection threshold is proportional to the number of samples and the RMS power value. The RIMS power value is set 9 dB below the peak deviation value. If the calculated threshold is less than the minimum pre-detection threshold, the received signal is too weak and all pre-detection searches associated with this calculated threshold are automatically rejected. A particular threshold is used for the 8 pre-detection points nearest the threshold position to determine if a detection has been found. For example, the pre-detection test associated with samples 1 to 8 uses the threshold value associated with sample point 4.

The entire initial FH pre-detection search process is briefly highlighted in the following summary:

A/D converted 40 KHz data samples from an 80 KHz incoming data stream are split into two 20 KHz "odd" and "even" data sequences by alternately sampling every other sample of the A/D converted data samples. The "odd" and "even" data sequences are then correlated against multiple segment sample points from a 20 KHz reference modulation code sequence to obtain "odd" and "even" correlation segments. The magnitudes of the "odd" and "even" correlation segments are summed to provide "odd" and "even" full width correlation and compared against a "running" power threshold to determine if a phasing signal has been detected. A detection is achieved when the received signal power estimate from the correlated samples exceeds the threshold power level and the sample start and end points defining the correlated samples are marked. FH Post-detection processing is then initiated in response to a phasing signal detection from the FH pre-detection processor. If, however, the received signal power estimate from the correlated samples does not exceed the threshold power level, then correlation continues with the next pair of samples and the FH pre-detection processor remains in its current state.

There may be up to two detections (full width correlations above threshold) for each pair of sample sequences. Also, two contiguous "hits" from adjacent pairs of sequences, i.e. a "late", or "even", detection from one pair and an "early", or "odd" detection from the next pair of sequences may occur. In this event, a single post-detection search is scheduled. For three or more contiguous detections, then two or more post-detection searches are scheduled. Initial FH pre-detection searches continue in the post-detection state.

After initial phase detection by the initial FH pre-detection search, FH post-detection processing 11 is initiated as illustrated in FIG. 1. The FH post-detection module provides a more refined detection test than the initial FH pre-detection module 10 and is adapted to remove bit ambiguity, reduce bit timing error, and decode the modulation code bits in the sample stream to determine the frequency hop time offset. The FH post-detection processing essentially consists of five steps; calculating a post-detection power threshold; computing "even" and "odd" 40 KHZ hopwidth correlations and summing their segment correlation magnitudes; comparing the correlation magnitudes with the threshold power and adjusting the phase by moving the sample pointer to the jam sync position when the threshold is exceeded; subsequently adjusting the rubber clock to remove timing errors; and determining the frequency hop time offset.

Figure 3:
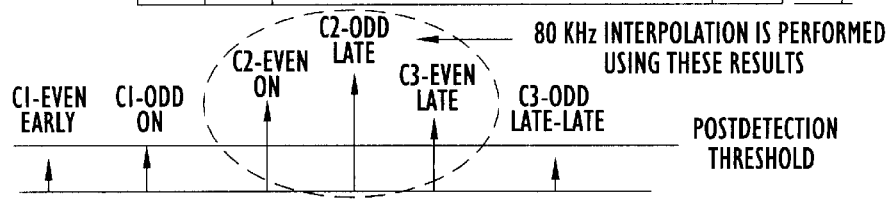
FIG. 3 is a diagram showing the frequency hopping post-detection correlation process.

FH post-detection processing removes bit ambiguity and reduces bit error by performing a series of correlation operations on the stored data sample streams as depicted in FIG. 3. Included in this process are the procedures to reduce the correlation results to a sample and fractional sample timing offsets. As shown in FIG. 3, the first step is to merge the "even" and "odd" received 20 KHz samples from the FH initial pre-detection process into a 40 KHz received sample sequence. The next step is to generate two 40 KHz Bessel reference sample sequences, an "even" and an "odd" reference, from the initial 80 KHZ incoming data samples stored in FIG. 1A reference numeral 11. As shown in FIG. 3, an 80 KHZ Bessel reference sample sequence is computed from the known bit pattern and the two 40 KHZ Bessel reference sample sequences are derived from the bits constituting the preamble subsegment 30 in addition to the modulation code reference segments 40. The preamble subsegment and modulation code reference segment bits are inverted prior to derivation of the two 40 KHZ Bessel analog reference sequences to achieve the proper polarity for the post-detection correlation process. As illustrated in FIG. 3, the preamble segment is included for the post-detection search. Both preamble and modulation code reference segments of the post-detection process have twice as many samples compared with the FH initial pre-detection module (i.e., 40 KHz versus 20 KHz). A Bessel shaping filter with a bandwidth of 20 KHZ is used to obtain the two 40 KHZ Bessel analog reference sequences. The third step correlates the two 40 KHZ "odd" and "even" Bessel reference sequences against the single merged 40 KHZ data sample sequence to obtain six 40 KHZ correlation results. Six correlation calculations per search are performed by moving the even and odd 40 KHZ Bessel sample sequences across the 40 KHZ received sample sequence. The motion for the even Bessel reference is 0 (on sample) and ±1 40 KHZ samples (i.e., one sample early and one sample late) from the first pre-detection sample position. The motion for the odd Bessel reference is 0, 1 or 2 samples from the first pre-detection sample position. The magnitudes of each segment correlation and preamble subsegment correlation of each segment (A, B, C, . . . N) for each 40 KHz reference are then summed. Since this process is performed for both the even and odd 40 KHZ Bessel references, there are six hop width correlation results as depicted in FIG. 3 step 3a–f. The resultant marks are ⅟₈₀ KHz (i.e., 12.5 microseconds) apart from one another. The first pre-detection sample defines the positions from which the Bessel references are moved; comprising −1, 0, 1 or 2 (40 KHZ) samples. When the modulation code reference segment sample sequences are correlated with their corresponding preamble segments, each segment correlation may have a positive or negative value. This is because the modulation reference code samples are transmitted with either normal or inverted polarity. The preamble segment is always sent in normal polarity. The absolute values of each even modulation code segment correlation are summed to form an even partial correlation result. Similarly, the absolute values of each odd modulation code segment correlation are summed to form an odd partial correlation result. The even and odd preamble segment correlations are added to the corresponding even and odd partial correlation results to obtain the even and odd hop-width correlation results.

Step 4 then compares the above described frequency hop width correlation results to a post-detection power threshold as illustrated in FIG. 3 to determine if any of the samples have sufficient energy to constitute a phasing signal detection. The largest of the six correlation results is compared to the post-detection energy threshold. If the largest correlation result does not exceed the energy threshold, then post-detection processing either continues with the next sample or terminates and transfers control to the FH initial pre-detection module for resuming the pre-detection search. However, if the largest correlation result exceeds this threshold, a post-detection phasing signal detection has occurred at that position and the 'jam sync' process is initiated. Alternatively, the FH post-detection process may apply parabolic fitting to determine whether a phase signal has been detected. In this case, the FH post-detection process applies parabolic fitting on three adjacent 'hop-width' correlation values, i.e., the largest sample and the correlations on either side of the largest sample. The parabolic fit computes the optimum sampling point and the maximum value at the optimum sampling point. The maximum value is then compared to the post-detection energy threshold. If the maximum value exceeds the threshold, a post-detection phase signal detection has occurred. The parabolic fit permits a higher threshold setting and reduces the bit sync error below ⅛ of a bit, thereby enhancing processor fidelity.

As noted above, the post-detection search requires at least one of six 40 KHz hop-width correlations to exceed the post-detection threshold value. The post-detection threshold value is derived by first finding the post-detection power $P_{POST}$. The value of $P_{POST}$ is half the sum of squares of all samples in the reference interval of the stored and merged 40 KHz sample sequence. A scale factor of one-half prevents an overflow from occurring in the calculation of $P_{POST}$.

$$P_{POST} = (0.5) * \sum_{I=3}^{FHASH-2} X^2(I)$$

In this calculation, X(I) is the i'th received FM demodulated 40 KHz sample sequence, and 'FHASH' is the last 40 KHz Active Sample in the merged 40 KHz sample sequence. The post-detection threshold is:

THRESHPOST=$K_{WT2}*P_{POST}$; $K_{WT2}$=⅟₁₆ where $K_{WT2}$ is the post-detection scale factor. If the largest of the six 40 KHz post-detection hopwidth correlation results does not exceed the post-detection threshold THRESHPOST, then this particular post-detection search is aborted. Similarly, if parabolic fitting is used, the post-detection search fails if the computed maximum value at the optimum sampling point does not exceed the post-detection threshold. The FH post-detection module then reverts to performing another pending post-detection search or terminates and transfers control to the FH initial pre-detection module for resuming the pre-detection search.

Figure 4:
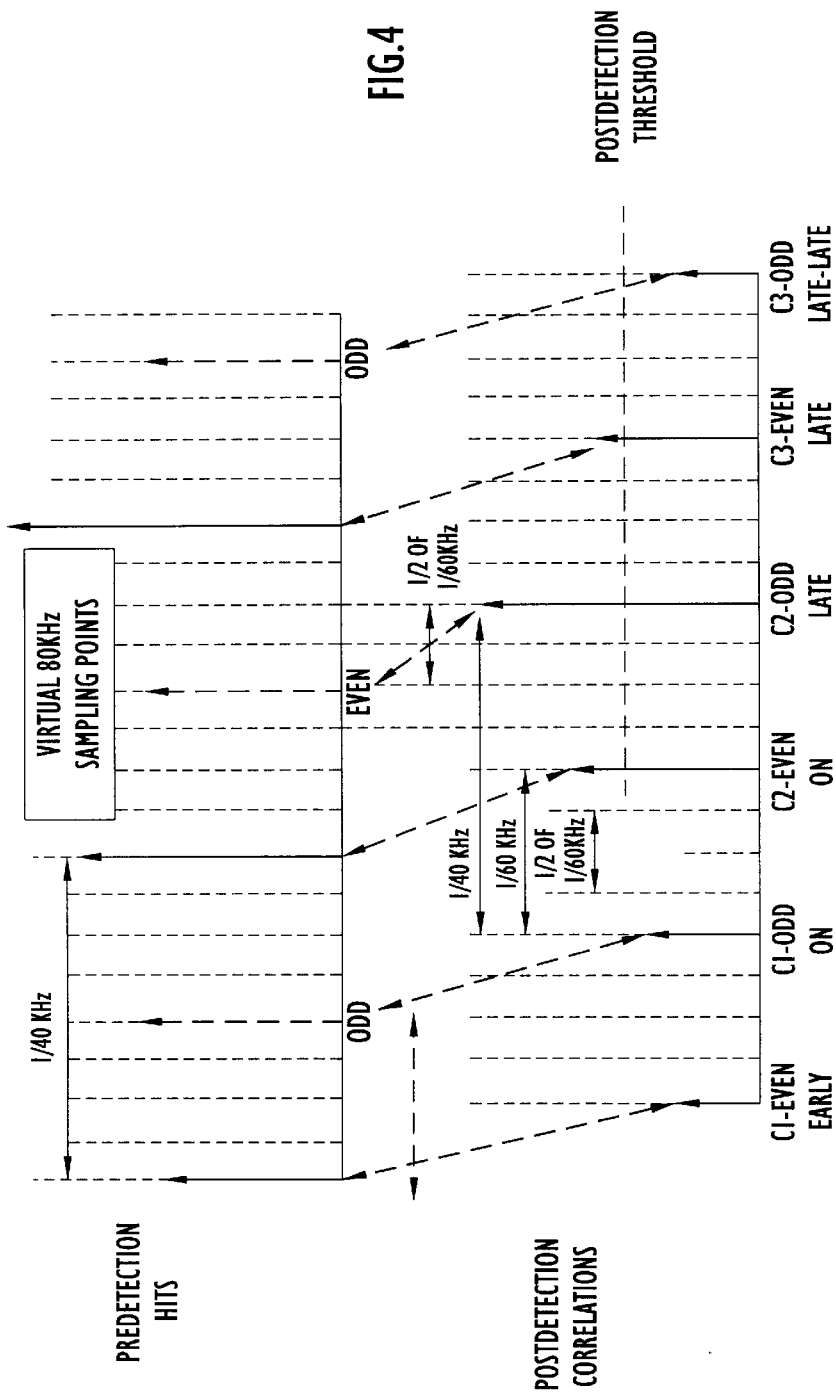
FIG. 4 is a diagram showing the frequency hopping post-detection correlation interpolation and jam sync process.
Figure 5:
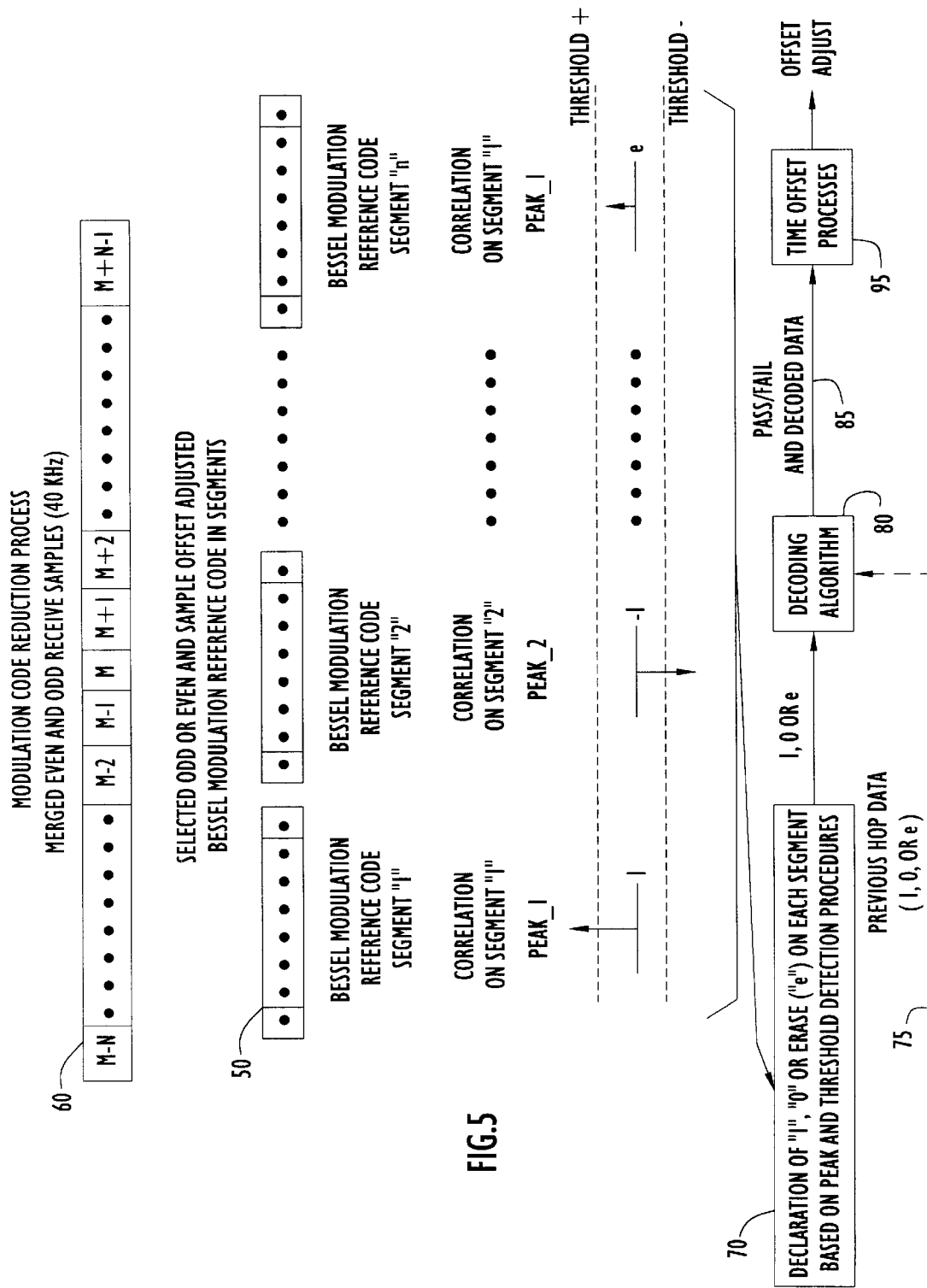
FIG. 5 is a diagram showing the frequency hopping post-detection correlation modulation code reduction process.

Following post-detection phasing signal detection, 'jam sync' processing is initiated. As illustrated in FIG. 4, The FH post-detection module jam syncs to the proper 80 KHz sample position in preparation for 80 KHz sampling. To do this, a software pointer is moved to the 80 KHz sample position that corresponds to the largest of the 40 KHz hop-width correlations. Each of the post-detection hopwidth correlations is associated with an actual 40 KHz sample or a potential 80 KHz interpolated sample that lies between two adjacent 40 KHz samples. These 40 or 80 KHz sample positions precede the 40 KHz hopwidth correlation positions by ¼ of a 40 KHz sample. The residual phase error is adjusted by deleting 24 Rubber Clock (RC) pulses. (There are 963.84 MHZ clock pulses per 40 KHz sample.) The residual bit sync error is approximately ⅛ bit. Following jam sync, a modulation code reduction process, shown in FIG. 5, is performed to determine the hop time offset and acquire FH synchronization. As shown in FIG. 5, the Bessel reference sample sequence 50 associated with the largest peak value is first obtained. The Bessel reference modulation code is then segmented for each code segment. The Bessel reference modulation code for each segment is then correlated against the merged 40 KHz received sample sequence 60. The correlation results 70 consisting of a '1', '0' or 'e' (erase) for each segment based on the peak and threshold detection procedures are then decoded using a decoding algorithm 80. Previous hop data 75 from the post-detection correlation results may optionally be combined with correlation results 70 for decoding. The output 85 of the decoding process is a passed or failed code word. If the decoded results pass, the decoded data yields the hop time offset adjustment and the post-detection process is suspended and the FH sync process transitions to module 12 to wait for data as illustrated in FIG. 1. If the decoded results fail, the post-detection search has failed, and any pre-scheduled pending post-detection search processing is performed. If there are no prescheduled post-detection searches, post-detection processing is suspended and control is transferred to the FH initial pre-detection search module 10.

Upon successful post-detection processing, extrapolation processing 12 is initiated prior to the TRANSEC frame sync tracking module 13 to enable 80 KHz sampling o f the data stream and track the data. After achieving FH synchronization the FH data does not begin until after a variable time interval. To determine that time interval, the modulation reference code was processed and decoded to yield the time offset. Clock adjustments based on the time offset are performed to adjust for phase errors due to clock frequency offset accumulation while waiting for the TRANSEC search to begin. For a clock offset of δ ppm, a data rate of R (bits/sec), and a time interval of t, the additional phase error is R* δ*t(bits).

Information about the data type that follows, and the specific correlation sequence, is embedded in the TRANSEC Frame Sync search pattern identified in FIG. 1 module 13. This information is distributed over several frequency hops. As shown in FIG. 1, if there is a TRANSEC search failure, the FH sync has failed and processing returns to the initial FH pre-detection search module 10. A TRANSEC search failure may occur if the post-detection search 11 falsely detects sync on a noise pattern or a signal below the spectral power requirement. The TRANSEC frame sync 13 may properly reject the sync position because no valid signal was present. In addition, A TRANSEC search failure may occur if the post-detection search 11 properly detects a valid sync position but a dropout or noise on the received signal causes the TRANSEC search to fail. In the absence of a failure, the TRANSEC search uses periodic bit position histograms to track and to reduce bit sync error to an acceptable level. At the end of the TRANSEC search, the system is in synchronization and is able to decode received data. When the FH TRANSEC search pattern 13 starts, a tracking loop is started. In each frequency hop, data transition position histograms are constructed and a weighted error estimate is input to the loop. The required update rate to the tracking loop is a function of the maximum bit rate offset. It is assumed that the maximum bit rate offset is 10 ppm and therefore the tracking loop update rate is the histogram or hop rate. If the maximum bit rate offset is 100 ppm or larger, then the tracking loop update rate could be made substantially larger than the hop rate to handle the large frequency offset. The tracking loop continues to operate throughout the reception until communication is interrupted because an EOM (end of message) is detected or reception has failed. Reception failure may be due to excessive packet decoding failures or a timeout from a long fade. When communication is interrupted, control is returned to the FH initial Pre-detection Search module 10.

Following each hop, all of the valid samples can be used to construct a bit transition position histogram. These histograms are constructed to derive a measurement of bit phase error. During TRANSEC frame sync search, a first order tracking loop is used to correct the initial error. Thereafter, the error metric drives a second order tracking loop to maintain bit sync. The histograms are updated at a variable tracking loop rate and processed to produce a phase error metric. For FH TRANSEC frame sync, there are a total of 4 samples/bit and 16 bins. The tracking loop will tend to average all of the corrections over multiple hops.

The properties of the ideal alignment are the following:

| BIT EDGE | TO LEFT OF BIN 8 | |
| SAMPLE 3 | LEFT EDGE OF BIN 12 | |
| SAMPLE 0 | LEFT EDGE OF BIN 0 | (Ideal Bit Center) |
| SAMPLE 1 | LEFT EDGE OF BIN 4 | |
| BIT EDGE | TO RIGHT OF BIN 7 | |

Figure 6:
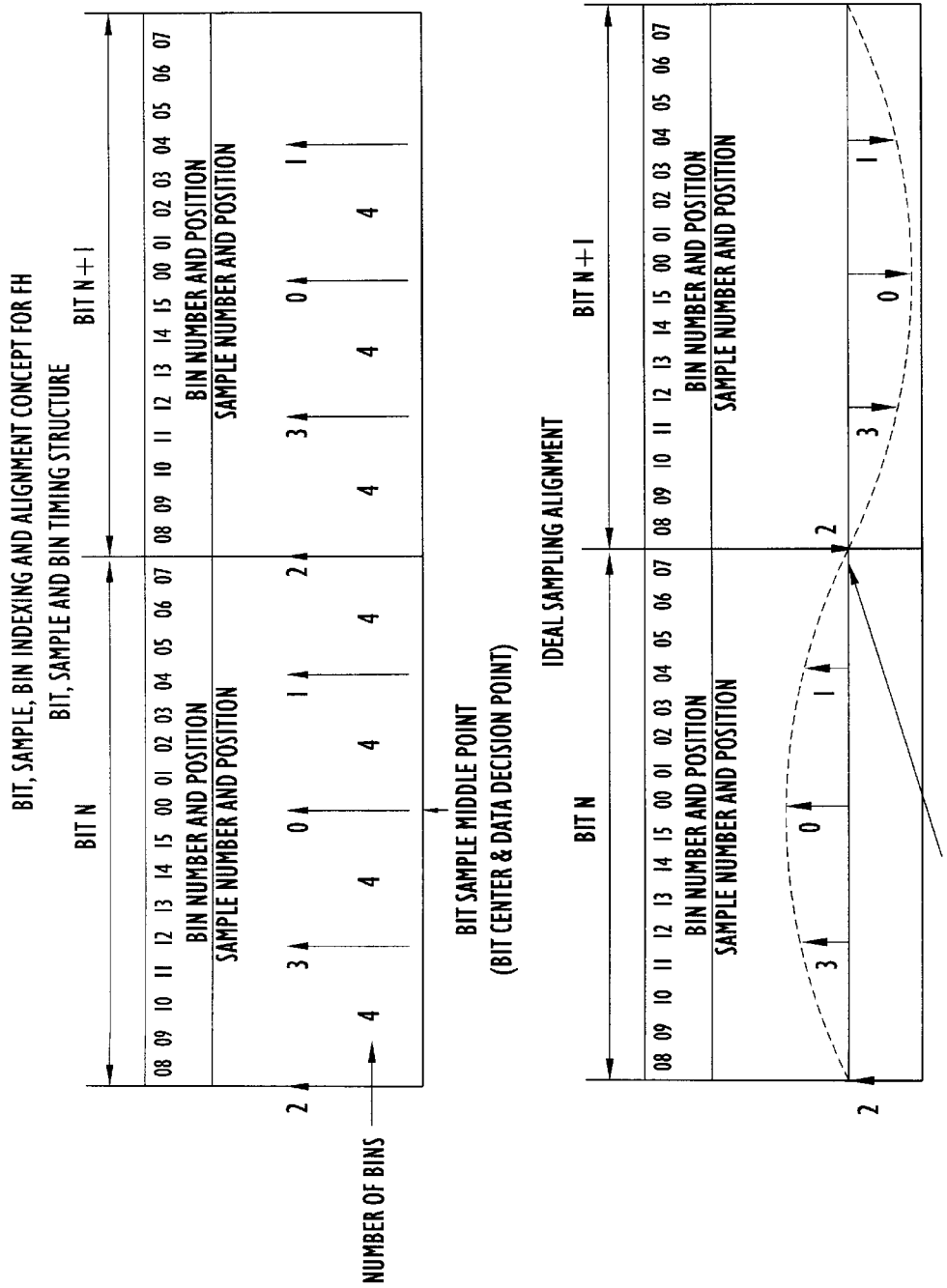
FIG. 6 shows an example of a bit, sample, bin indexing and alignment frequency hopping concept.

FIG. 6 illustrates the ideal alignment of bit samples and bins. Sample 0 is the sampling point for data decisions and should be located between bin 15 and bin 0. The bit transitions should therefore be at sample 2 which is positioned between bins 7 and 8.

Figure 7:
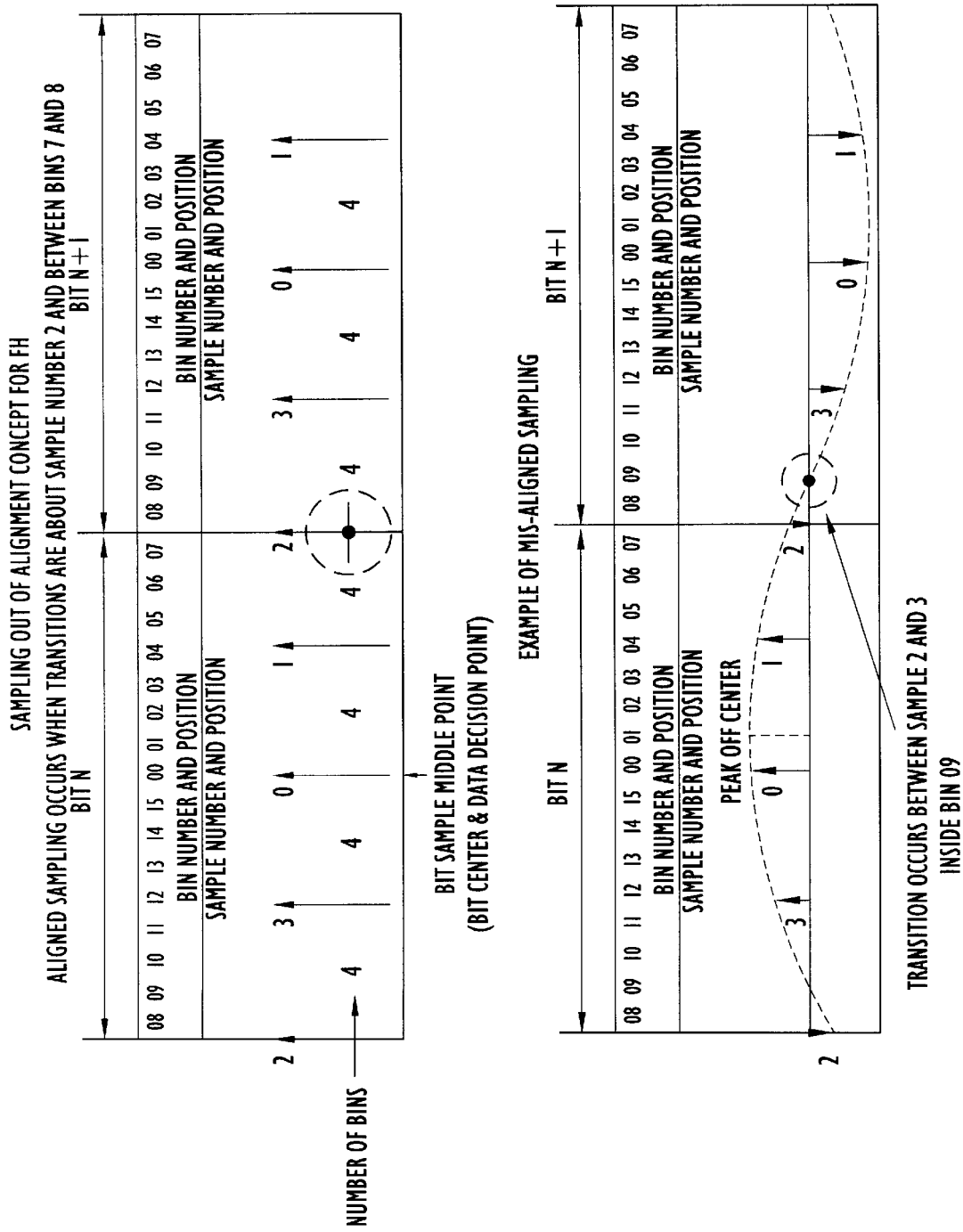
FIG. 7 is a diagram useful for showing a frequency hopping sampling out of alignment.

The concept of sampling misaligned data, and the calculations of transition interpolation, and bin assignment used for histogram generation are shown in FIGS. 7 and 8.

The following procedure is used to generate histograms and supply bit edge error measurements to the tracking loop:

1. Collect all valid FHASH (Frequency Hop Active Samples per Hop samples in a single hop.
2. Look for sign changes (transitions) between samples.
3. If there are sign changes, perform linear interpolations to find fractional sample position.
4. For each transition, calculate the bin number and increment its associated bin counter to form histogram.
5. Apply weighting curve to find phase error metric.
6. Find the ratio of the difference of the edge 6 bin count and the center 6 bin count to the total count. This ratio is the input to the fade detection/signal detection betting circuit.

This ratio is used during normal tracking. After a fade or during initial operation, when there may be substantial bit sync errors, other phases of this ratio may be used to perform a random data detection.

In the histogram generation process each transition position is determined by interpolation, assigned to a histogram bin and counted. Interpolations between samples are calculated via a 2 cycle divide, with results of 0, ¼, ²⁄₄, or ¾ of a sample. This is equivalent to 0, 1, 2 or 3 bins. The fractional sample position, x, is obtained by linear interpolation of two adjacent sample values (with opposite signs).

x=.v(m)✓.v(m+1)−v(m); (v(m), v(m+1) are sample values)

If M is the sample number prior to a data transition, (i.e. samples 0 to 3), and x is the fractional sample position, then bin number N is:

N=4(M+x); with N in the range (0,15).

For example, if the sample just prior to a transition were sample 3 and the fractional position x equaled '²⁄₄', Bin number N is:

N=4*(3+²⁄₄)=14.

After each transition position and its related bin number are calculated, the appropriate bin counter is incremented. The output of histogram processing is a phase error metric which is input to the tracking loop. The tracking loop output is a rubber clock command which tries to keep the sampling point at the center of each bit. The phase error estimate is obtained by applying a weighting curve to the histogram. As shown in FIG. 9, the resulting histogram is weighted by a function with odd symmetry about the bit edge. The weighting function is shown below. If all or most of the transitions occur near bins 7 and 8 (i.e. near the bit edge), the weighted error is close to 0. If there is a larger error, the tracking loop drives the rubber clock to restore the proper bit sync. The weighting function is 'discounted' near the edges to prevent outliers from perturbing the phase error estimate. This weighted error estimate is the value applied to the tracking loop for a valid condition. A valid condition exists if the system is not in a fade and there is an adequate histogram ratio.

| BIN NO. | WEIGHTING | BIN NO. | WEIGHTING |
|---------|-----------|---------|-----------|
| 0 | 3 | 8 | −1 |
| 1 | 7 | 9 | −3 |
| 2 | 11 | 10 | −5 |
| 3 | 9 | 11 | −7 |
| 4 | 7 | 12 | −9 |
| 5 | 5 | 13 | −11 |
| 6 | 3 | 14 | −7 |
| 7 | 1 | 15 | −3 |

Figure 10:
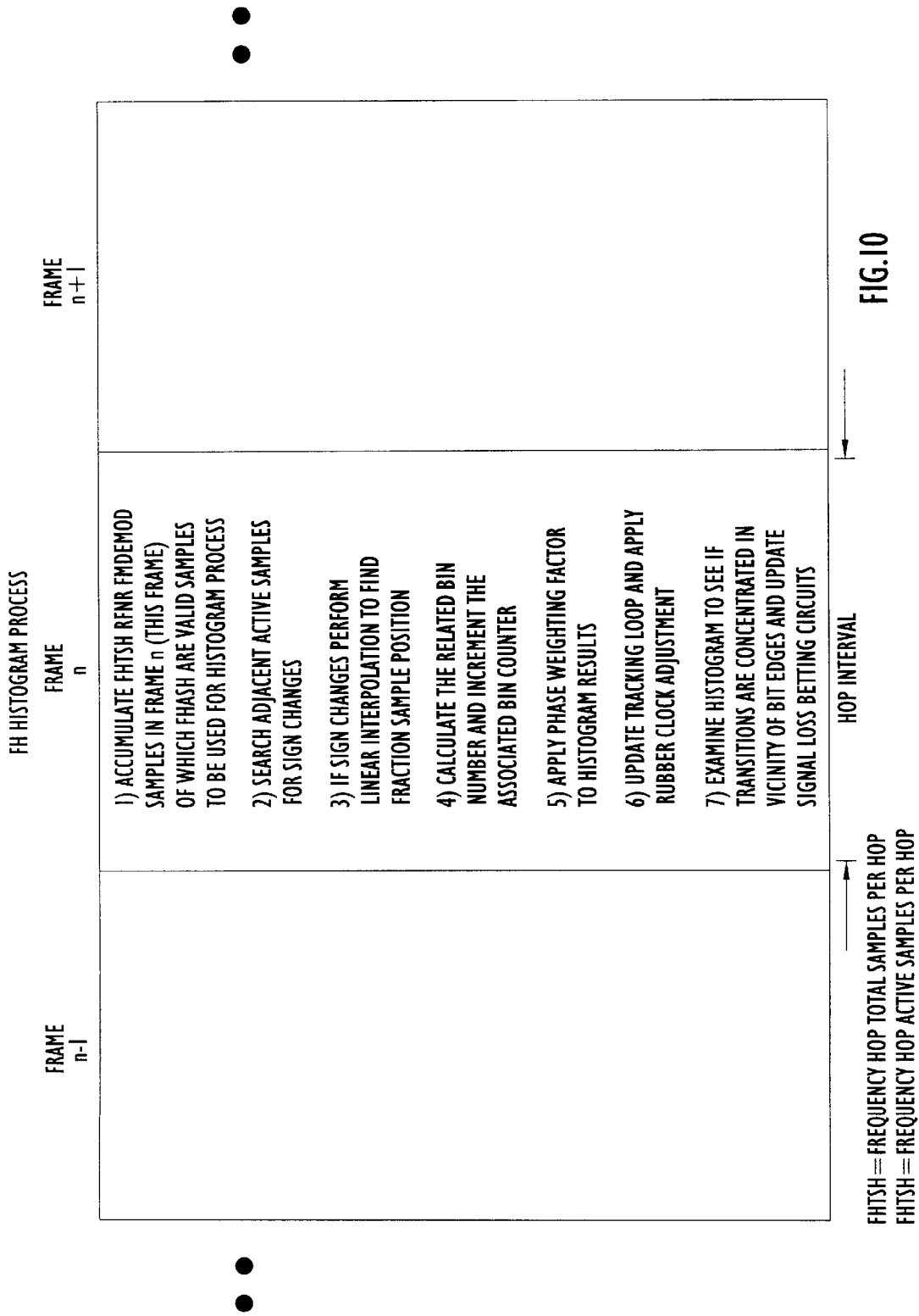
FIG. 10 is a diagram depicting the process employed for the generation of frequency hopping histograms.

FIG. 10 shows the process for providing and developing the histogram for FH TRANSEC frame sync and tracking. A histogram is a representation of a distribution function where a plurality of values is divided and placed in bins or placed at intervals. Technically, it is a graphical representation of a distribution function by means of rectangles whose widths represent intervals into which the range of observed values is divided and whose heights or amplitudes represent the number of observations occurring in each interval. Thus, the weighting number represents the height or amplitude and the bin represents the interval. The phase error metric is thus the sum of the products of the bin counts and the bin weights, with the goal of the tracking loop to drive the weighted bin error to zero.

Figure 11:
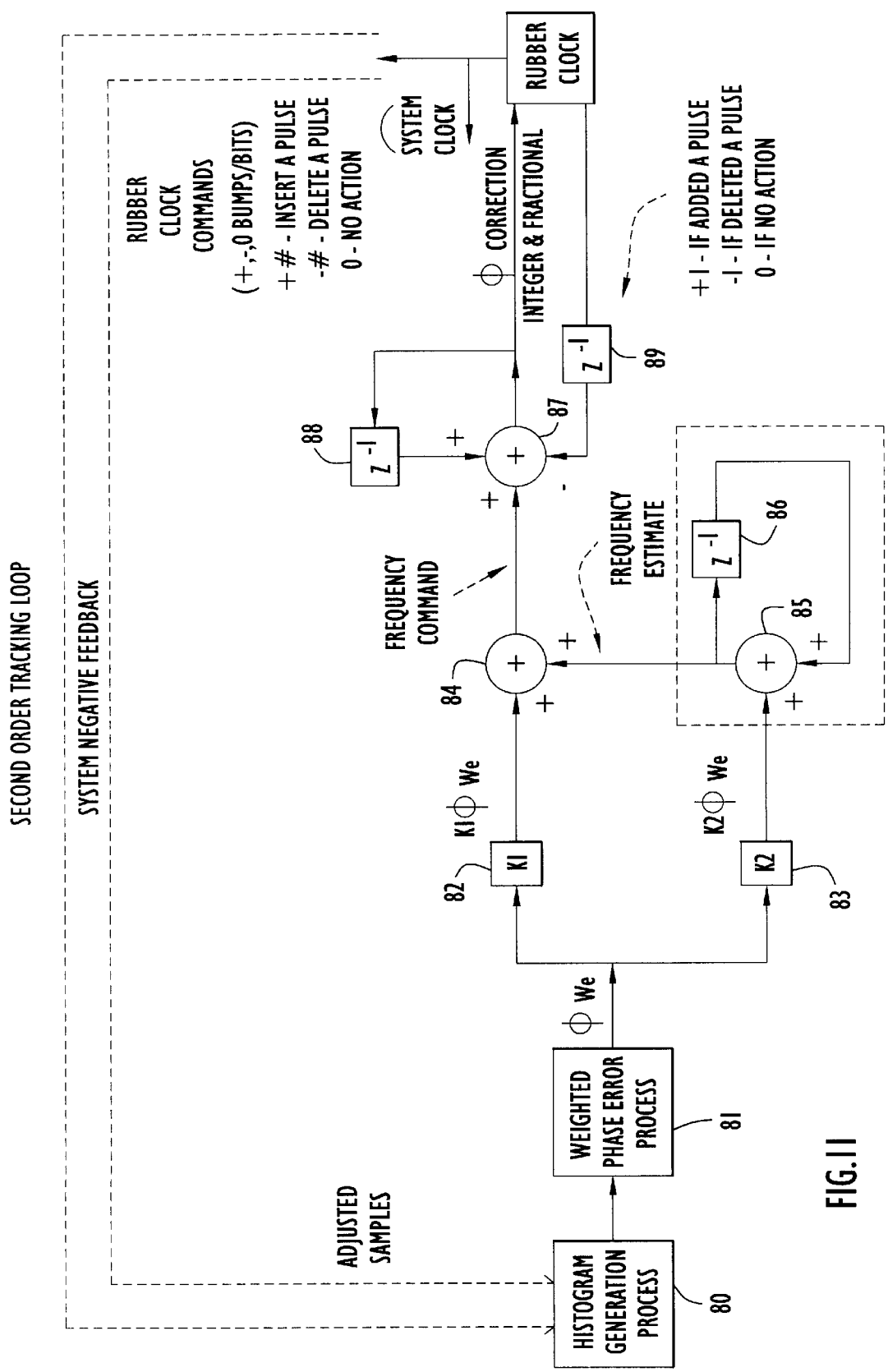
FIG. 11 is a block diagram depicting the frequency hopping tracking loop for controlling the system clock.

The second order tracking loop shown in FIG. 11, is a control system that is fed a sequence of weighted bin errors. It, in turn, generates phase corrections which drive a rubber clock in the direction that will tend to minimize a function of the weighted bin error. The response time of the loop is a function of the gain parameters K1 and K2. Note that the loop is closed through the system because the rubber clock drives the A/D sampling clock which in turn realigns the sample positions.

Referring to FIG. 11, there is shown a histogram generation process designated by the reference number 80. This can be implemented by a digital signal processor or a microprocessor and involves the above described operation. The output from the histogram process is directed to module 81 designated as a weighted phase error process. As explained above, the phase error is the sum of the products of bin counts in regard to the histogram. This error is then applied to a first and a second data bin each having amplifiers or gain parameters designated as 82 and 83. Each of the parameters are then provided to respective adders as 84 and 85 where a frequency estimate is derived through adder 85 using a digital filter 86 to derive a frequency estimate at the output of adder 85, which frequency estimate is directed to adder 84 to produce a frequency command to adder 87 associated with digital filters 88 and 89. The output of adder 87 is the correction integer which is directed to the rubber clock module 90. The rubber clock module is a clock circuit which is controlled by means of a variable reactance device such as a variable reactance inductor and is capable of having the clock frequency shifted by or otherwise changed. One can do this by adding pulses or deleting pulses, or can actually vary the frequency of such a rubber clock. The output of the clock 90 is directed to the receiver system for enabling one to process the data, as for example for sampling each of the digital bits at the center. The output of the clock 90 is also directed back to the histogram generation process to provide that with adjusted samples so that synchronization is maintained. The output of the tracking loop is a variable scaled to an integer and fractional multiple of the 'rubber' clock pulse interval. When the loop output exceeds a level corresponding to an integer clock pulse, the rubber clock pulse count is incremented (or decremented if negative). A corresponding integer value is subtracted from the phase correction. The tracking loop and rubber clock maintain bit sync during normal communications and during short fades. During the TRANSEC frame sync search and initial tracking, the tracking loop is first order, i.e. $K_2=0$. The system maintains the tracking state until either an end of message (EOM) is detected, there are RS failures or there is a detection of signal loss. As shown in FIG. 1, if there is a detected EOM or there are RS KI (Reed-Solomon Key Indicator) failures or Packet RS ECB (Reed-Solomon Error Control Block) failures, the system returns to the initial search state. If a signal loss is detected, then the FADE state 15 is entered.

The histograms that were used for tracking are also used to detect signal drop-out or fades. They are also used to return from a brief fade. The decision to enter or return from the fade state is based on a signal loss 'betting' circuit.

The following assumes that a group of histograms are used directly as an input to the betting circuit. This histogram group is in the form of a single histogram, except that the counts in a given bin of the group histogram is the sum of all the histogram counts for that bin in the individual histograms of the group.

After a successful TRANSEC frame sync search, i.e. when a start of message (SOM) is detected, the betting circuit count is set to an initial value, e.g.3. After each group histogram has been generated, the difference between the number of transitions from the 6 transition bins (Bins 5 through 10) and the number of transitions from the 6 center bins (Bins 13 to 15 and 0 to 2) is calculated. This difference is compared to the total number of transitions in the histogram. If the ratio of the difference to the total is greater than the signal ratio threshold, $THRESH_{SIGRT}$, a signal present condition indication exists. If this ratio is less than or equal to the threshold, then a signal absent condition exists. Also, if the total number of counts in the group histogram is less than the group histogram lower threshold, $THRESH_{GHLC}$, a signal absent condition indication exists. If the histogram signal ratio is above $THRESH_{SIGRT}$ and the total number of counts is above $THRESH_{GHLC}$, then a signal present condition indication exists.

Data continues to be detected and processed until the process return to the initial search state. If a signal is indicated, one is added to the betting circuit count. If no signal is indicated, one is subtracted from the betting circuit. If the count is incremented above the maximum value, (e.g.6), then the count is returned to the maximum value. If the count decrements to ZERO, a FADE is declared and a fade timer is started. While in a FADE, betting circuit calculations continue. If the count is decremented to a negative value, then the count is returned to zero.

During a FADE, the tracking loop is frozen, that is, it continues to predict bit sync for the duration of the fade, but no further weighted histogram corrections are input to the loop.

While in a FADE, if the betting circuit count reaches the signal detection threshold value (e.g.4), then the system returns to the normal tracking state (State E of FIG. 1) and resumes sending weighted histogram corrections to the bit tracking loop. If the betting circuit count reaches the maximum value, then the FADE is declared over and the loop will need a new FADE longer than the maximum permissible FADE to cause a return to the search state.

Upon exceeding the time of a permissible FADE, the FADE state is terminated and the system returns to the Initial Search State.

While specific circuit implementations have not been shown, it is indicated that one skilled in the art would have no difficulty in implementing the digital circuitry required to produce the above described functions. Such digital circuitry is available in modules designated as digital signal processor modules or DSPs. These modules contain suitable circuitry to implement the above described functions including correlation and clock operation as well as summation and energy calculations.

What is claimed is:

1. A digital communications system, comprising:
   a transmitter for transmitting a digital data signal via a noisy transmission path, said digital data signal having a phasing signal portion and a framing signal portion; and
   a receiver responsive to said transmitted signal, said receiver comprising:
   a detector responsive to incoming data samples representative of said phasing signal portion of said digital data signal, said detector partitioning said incoming data samples into alternating first and second sample sequences and correlating said sequences against a hop frequency modulation code reference sequence to provide an output signal indicative of correlated data samples and of a data signal detection;
   a post-detector responsive to said output signal and to said hop frequency modulation code reference sequence for correlating said incoming data samples and comparing a spectral power of said correlated data samples to a threshold value to provide a sync output signal indicative of frequency hop synchronization of said digital data signal;
   a tracker responsive to said sync output signal and said digital data signal for periodically providing histograms of data bit transitions for producing an error signal indicative of the difference of the transmitted clock rate and the sampling position of a received bit; and
   a clock responsive to said error signal to provide a clock signal according to said error signal to drive sampling of received data bits toward the center of each bit.

2. The digital communications system according to claim 1, wherein said detector further includes a comparator adapted to compare the spectral power of said correlated data samples with a threshold energy at particular sample points to determine the presence of said digital data signal.

3. The digital communications system according to claim 1, wherein said incoming data samples are provided to said detector at a rate of 80 KS/sec, and wherein every other sample of said incoming data samples is selected for partitioning into said alternating first and second sample sequences.

4. The digital communications system according to claim 1, wherein said post-detector further includes means for jam synchronizing, to a predetermined sampling frequency, said incoming data samples corresponding to correlated data samples whose spectral power exceeds said threshold value.

5. The digital communications system according to claim 1, wherein said post-detector further includes means for decoding said hop frequency modulation code reference sequence to determine a hop-time offset clock drift.

6. The digital communications system according to claim 5, further including extrapolation means responsive to said hop-time offset clock drift for adjusting said clock signal to remove phase error accumulations resulting from an interval between termination of said post-detector and initiation of said tracker.

7. The digital communications system according to claim 1, wherein said post-detector includes Bessel shaping filters for correlating said incoming data samples.

8. The digital communications system according to claim 1, further including means responsive to said histograms for detecting fading of said digital data signal.

9. The digital communications system according to claim 1, further including:
   means for portioning a data bit period into a plurality of bins for storing a weight factor in each bin indicative of the distance of the data bit center of the data bit edge.

10. A method of detecting a phasing signal pattern and a framing signal in a transmitted digital data signal for using said transmitted digital data signal to synchronize a clock at a receiver, the method comprising the steps of:
    receiving incoming data samples representative of said digital data signal at a predetermined sampling rate R;
    sampling every other said received incoming data samples and alternately partitioning said every other said sampled incoming data sample into a first odd and second even sample sequences, whereby said first odd and second even sample sequences sampling rates are one-fourth of said predetermined sampling rate R;
    correlating said odd and even sample sequences against a hop frequency modulation reference code sequence to obtain odd and even correlation values;
    summing the magnitudes of said odd and even correlation values;
    computing a power measurement during a predetermined period representative of the spectral energy of said odd and even correlated values;
    comparing said power measurement with a stored signal energy estimate to provide an output signal if the comparison exceeds a given threshold value, wherein said output signal includes an indication of the start and end points of correlated samples;
    merging said odd and even sample sequences into a unified sample sequence;
    generating first odd and second even reference sample sequences from a combination of preamble bit pattern samples of a known preamble bit pattern and the hop frequency modulation reference code sequence;
    correlating said odd and even reference sample sequences against said unified sample sequence to provide multiple hop-width correlation samples having multiple hop-width correlation values;
    computing a post-detection power measurement during a predetermined period representative of the spectral energy of said hop-width correlation values;
    comparing said post-detection power measurement with a second stored signal energy estimate to provide a sync output signal if the comparison exceeds a given post-detection threshold value;
    decoding said hop frequency modulation reference code sequence to determine a hop-time offset clock drift; and
    adjusting the receiver clock to remove phase error resulting from said hop-time offset clock drift.

11. The method of claim 10, further including the steps of:
    repositioning said multiple hop-width correlation samples by jam synchronizing said hop-width correlation samples to a predetermined sampling frequency; and
    deleting clock offset pulses associated with said repositioning to remove residual phase error;
    wherein said steps are performed prior to said decoding step.

12. The method of claim 11, wherein said predetermined sampling rate R and said predetermined sampling frequency are 80 KHz, and wherein said unified sample sequence, said first odd and second even reference sample sequence, and said multiple correlation sample sequence rates are 40 KHz.

13. The method of claim 10, wherein said multiple hop-width correlation samples include even and odd hop-width correlations, said even hop-width correlations determined by summing the absolute values of even modulation code segment correlations and even preamble segment correlations, said odd hop-width correlations determined by summing the absolute values of odd modulation code segment correlations and odd preamble segment correlations.

14. The method of claim 10, further including tracking the incoming data samples by:
   periodically generating histograms of data transition positions for each frequency hop;
   updating said generated histograms at the tracking rate to produce a phase metric error;
   applying said phase metric error to a clock for synchronizing said clock to said transmitted data signal.

15. The method of claim 14, wherein the step of generating said histograms comprises the steps of:
   collecting data samples for each frequency hop during a given frame period;
   detecting transition between said data samples;
   linearly interpolating said data samples upon detection of a transition to provide a fractional sample position;
   calculating a bin number for each transition;
   incrementing an associated bin counter to form histograms for said data samples.

16. The method of claim 15, further including the steps of:
   applying a weighting curve to said histograms to provide said phase error metric;
   comparing the ratio of the difference of bin counts near bit edge and bin counts near bin center to the total count for a particular bin to provide threshold signals determinative of input signal fading.

17. The method of claim 16, wherein said particular bin is bin 6.

18. The method of claim 15, wherein said data samples used for said histogram generation comprise all frequency hop active samples per hop, and wherein said all frequency hop active samples per hop are a subset of all frequency hop total samples per hop.

19. The method of claim 15, wherein the steps of generating histograms includes partitioning of the data bit period into a predetermined number of bins according to the system sampling rate.

20. The method of claim 19, wherein said data bit period is partitioned into 16 bins with 4 bins between samples.

21. The method of claim 10, wherein said post-detection power measurement comparison includes the steps of:
   determining a mark representative of the maximum of said hop-width correlation values;
   comparing said mark with said post-detection threshold value.

22. The method of claim 21, wherein said determination includes applying parabolic fitting on three adjacent hop-width correlation values to determine the maximum value at the optimum sampling point.

23. In a receiver of a digital communication system, a method of achieving synchronization with a digital signal received by the receiver and modulated in accordance with a modulation code known to the receiver, in order to allow the receiver to time align the sampling of the digital signal to a timing of the digital signal, the digital signal having a synchronization portion and a data portion, the method comprising the steps of:
   (a) accumulating at the receiver a sequence of samples of the synchronization portion of the digital signal;
   (b) detecting and coarsely estimating the timing of the digital signal by correlating samples in the sequence of samples with a modulation reference code sequence;
   (c) finely estimating the timing of the digital signal by correlating samples of the sequence of samples with a refined reference sequence at a plurality of different correlation timings offset by predetermined durations from the coarsely estimated timing of the digital signal, a finely estimated timing of the digital signal being determined from correlations at the plurality of different correlation timings; and
   (d) adjusting a timing of a clock of the receiver in accordance with the finely estimated timing of the digital signal to synchronize sampling of the digital signal at the receiver to the timing of the digital signal.

24. The method of claim 23, wherein step (b) includes identifying the coarsely estimated timing of the digital signal as a time when a correlation value determined from values of the samples correlated with the modulation reference code sequence exceeds a threshold.

25. The method of claim 23, wherein step (b) includes selecting every other sample in the sequence of samples to form a sub-sequence, and forming odd and even sample sequences from alternating samples of the sub-sequence, the odd and even sample sequences being correlated with the modulation reference code sequence to detect the digital signal and to determine the coarsely estimated timing of the digital signal.

26. The method of claim 23, wherein step (c) includes:
   (c1) computing a sum of the correlated samples at each of the plurality of different correlation timings;
   (c2) determining a finely estimated timing of the digital signal from the computed sums; and
   (c3) identifying the finely estimated timing of the digital signal as the correlation timing associated with the largest of the computed sums.

27. The method of claim 23, wherein step (c) includes:
   (c1) computing a sum of the correlated samples at each of the plurality of different correlation timings;
   (c2) determining a finely estimated timing of the digital signal from the computed sums; and
   (c3) fitting a parabolic curve to the sums of the correlated samples at the plurality of different correlation timings and identifying the finely estimated timing of the digital signal as a maximum point on the parabolic curve.

28. The method of claim 23, wherein step (c) includes:
   (c1) forming an odd reference sequence and an even reference sequence from the sequence of samples accumulated in step (a);
   (c2) selecting every other sample in the sequence of samples accumulated in step (a) to form a refined sample sequence;
   (c3) correlating the odd reference sequence with the refined sample sequence at a set of said plurality of different correlation timings; and
   (c4) correlating the even reference sequence with the refined sample sequence at a set said plurality different correlation timings.

29. The method of claim 23, wherein the refined reference sequence is a Bessel reference sample sequence.

30. The method of claim 23, wherein the plurality of different correlation timings are offset by i sample periods from the coarsely estimated timing of the digital signal, where i is a positive integer, a negative integer or zero.

31. The method of claim 23, wherein the digital signal is a frequency hopped signal.

32. The method of claim 23, further comprising the steps of:
  (e) sampling bits of the data portion of the digital signal to acquire a sequence of digital sample values;
  (f) determining data bit transition times of the digital signal from the digital sample values;
  (g) forming a histogram of data bit transition times;
  (h) calculating a phase error metric as a function of the histogram; and
  (i) using the phase error metric to adjust a timing reference of the receiver to synchronize the sampling with data bits of the digital signal.

33. A digital communication system, comprising:
  a transmitter adapted to transmit a digital signal modulated in accordance with a modulation code and having a synchronization portion and a data portion;
  a receiver adapted to detect the digital signal and synchronize sampling of the digital signal with a bit timing of the digital signal, said receiver comprising:
    an analog-to-digital (A/D) converter that samples the digital signal to produce a sequence of samples of the synchronization portion of the digital signal;
    a pre-detector adapted to detect and coarsely estimate a timing of the digital signal by correlating samples in the sequence of samples with a modulation reference code sequence;
    a post-detector that finely estimates the timing of the digital signal by correlating samples of the sequence of samples with a refined reference sequence at a plurality of different correlation timings offset by predetermined durations from the coarsely estimated timing of the digital signal, said post-detector determining a finely estimated timing of the digital signal from correlations at the plurality of different correlation timings; and
    an adjustable clock that provides a timing reference for sampling the digital signal, the timing of said adjustable clock being adjusted in accordance with the finely estimated timing of the digital signal to synchronize sampling of the digital signal at said receiver to the timing of the digital signal.

34. The system of claim 33, wherein said pre-detector identifies the coarsely estimated timing of the digital signal as a time when a correlation value determined from values of the samples correlated with the modulation reference code sequence exceeds a threshold.

35. The system of claim 33, wherein said pre-detector selects every other sample in the sequence of samples to form a sub-sequence and forms odd and even sample sequences from alternating samples of the sub-sequence, said pre-detector correlating the odd and even sample sequences with the modulation reference code sequence to detect the digital signal and to determine the coarsely estimated timing of the digital signal.

36. The system of claim 33, wherein said post-detector computes a sum of the correlated samples at each of the plurality of different correlation timings and determines a finely estimated timing of the digital signal from the computed sums, said post-detector identifying the finely estimated timing of the digital signal as the correlation timing associated with the largest of the computed sums.

37. The system of claim 33, wherein said post-detector computes a sum of the correlated samples at each of the plurality of different correlation timings and determines a finely estimated timing of the digital signal from the computed sums, said post-detector fitting a parabolic curve to the sums of the correlated samples at the plurality of different correlation timings and identifying the finely estimated timing of the digital signal as a maximum point on the parabolic curve.

38. The system of claim 33, wherein said post-detector forms an odd reference sequence and an even reference sequence from the sequence of samples and selects every other sample in the sequence of samples to form a refined sample sequence, said post-detector correlating the odd reference sequence with the refined sample sequence at a plurality of different correlation timings and correlating the even reference sequence with the refined sample sequence at a plurality of different correlation timings.

39. The system of claim 33, wherein the refined reference sequence is a Bessel reference sample sequence.

40. The system of claim 33, wherein the plurality of different correlation timings are offset by i sample periods from the coarsely estimated timing of the digital signal, where i is a positive integer, a negative integer or zero.

41. The system of claim 33, wherein the digital signal is a frequency hopped signal.

42. The system of claim 33, wherein said A/D converter samples bits of the data portion of the digital signal to acquire a sequence of digital sample values, the system further comprising a processor receiving the sequence of digital sample values and determining data bit transition times of the digital signal from the digital sample values, said processor forming a histogram of data bit transition times and calculating a phase error metric as a function of the histogram, said adjustable clock being responsive to the phase error metric to adjust the timing reference of the receiver to synchronize the timing of the samples with data bits of the digital signal.

* * * * *